Oct. 21, 1941.　　　W. MARSHALL　　　2,260,119
CLUTCH ASSEMBLY
Filed June 28, 1940　　　2 Sheets-Sheet 1
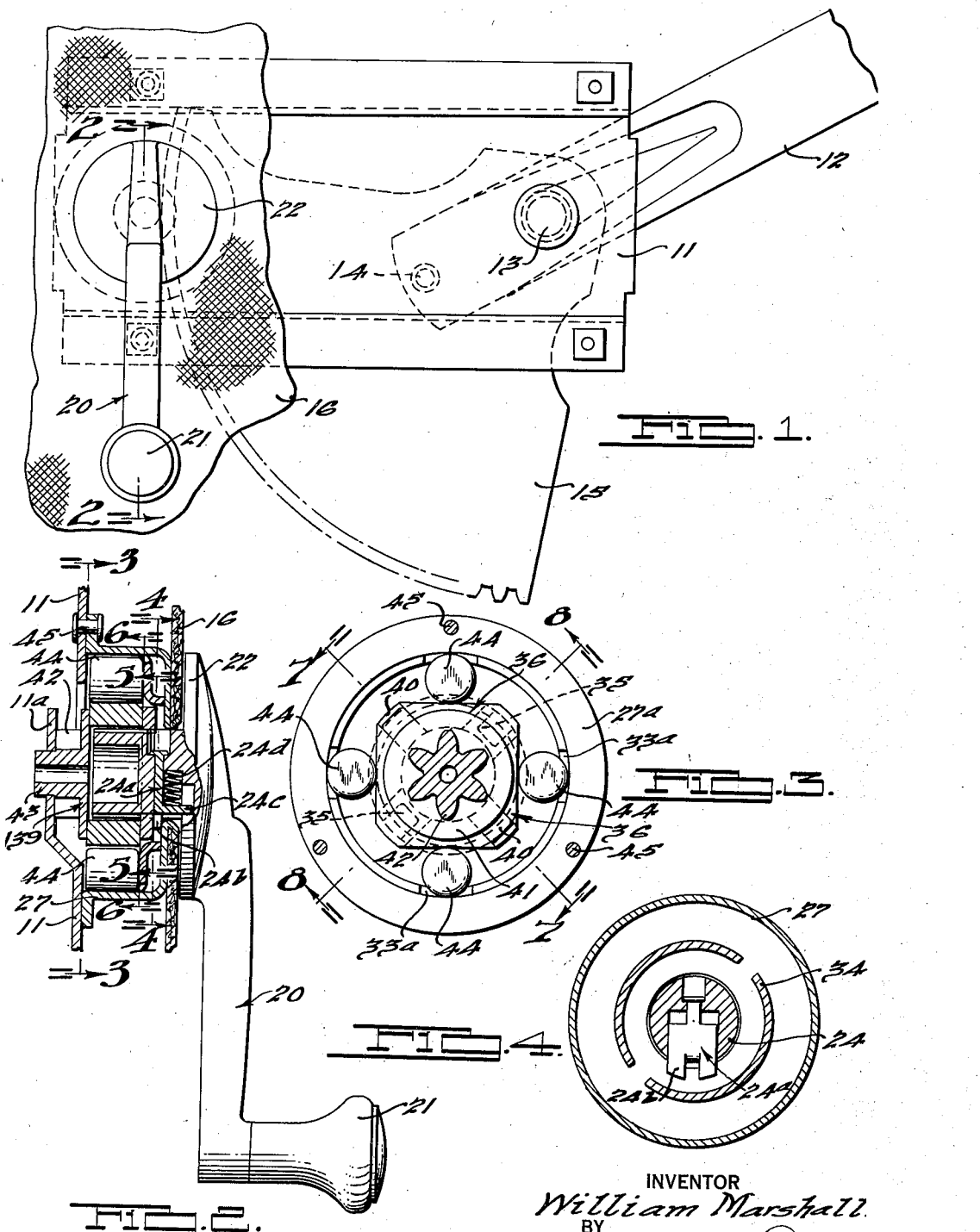
INVENTOR
William Marshall
BY
Dike, Calver & Gray
ATTORNEYS

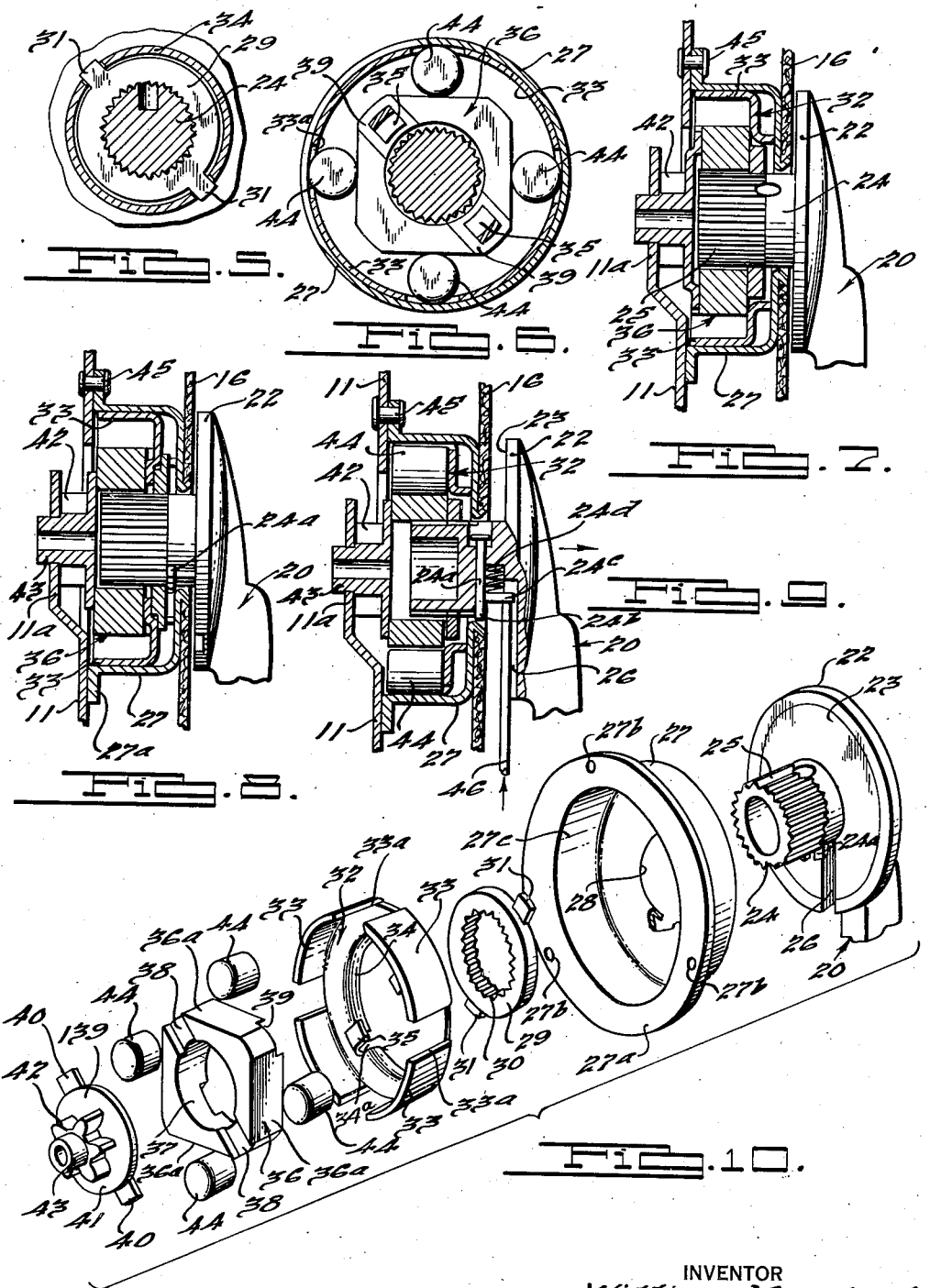

Patented Oct. 21, 1941

2,260,119

UNITED STATES PATENT OFFICE 2,260,119

CLUTCH ASSEMBLY

William Marshall, Detroit, Mich., assignor to Briggs Manufacturing Company, Detroit, Mich., a corporation of Michigan Application June 28, 1940, Serial No. 342,865

17 Claims. (Cl. 192—8)

This invention relates to clutch assemblies adapted for use in connection with window regulators or control mechanism for operating vehicle windows, doors or the like. While the invention is particularly well adapted for this use, it is capable of various other uses especially in connection with mechanism for operating and controlling closures for openings of various kinds.

One of the objects of the invention is to provide an improved assembly of the foregoing character which includes an operating handle capable of assuming an operating position relatively close to or approximately flush or contiguous with the trim or adjacent surface of the vehicle body.

Another object of the invention is to provide an improved clutch assembly capable of being manufactured at relatively low cost and one which is capable of quick and easy assembly and application to a body.

A further object of the prevent invention is to provide a novel clutch assembly which includes improved means to prevent the opening or any substantial movement of the vehicle window glass, door glass or panel, in any manner other than by the authorized use of the operating handle provided for such purpose.

Another object of the invention is to provide an improved clutch device of compact structure useful in conjunction with a handle assembly of the type which is nearly or approximately flush with the trim of the body and in which the operating handle telescopes into the clutch device and may be quickly removed or assembled therewith.

Still a further object of the invention is to provide a clutch and handle assembly for a vehicle or automobile window regulator, which assembly is so simplified and compact as to occupy a minimum of space not only at the inner side of the vehicle body interior trim but also in the space between the trim and the outer body or door panel.

The above and other objects of the invention will appear from the following description and appended claims when considered in connection with the accompanying drawings forming a part of this specification wherein like reference characters designate corresponding parts in the several views.

In the drawings:

Fig. 1 is a front elevational view, with parts broken away, showing one application of the clutch assembly embodying the present invention in connection with a window regulator.

Fig. 2 is an enlarged vertical section taken substantially along the line 2—2 of Fig. 1, looking in the direction of the arrows.

Fig. 3 is a vertical section taken substantially along the line 3—3 of Fig. 2, looking in the direction of the arrows.

Fig. 4 is a section taken along the line 4—4 of Fig. 2 in the direction of the arrows.

Fig. 5 is a section taken along the line 5—5 of Fig. 2, looking in the direction of the arrows.

Fig. 6 is a vertical section taken along the line 6—6 of Fig. 2 looking in the direction of the arrows.

Fig. 7 is a sectional view, partly in elevation, taken substantially along the line 7—7 of Fig. 3, looking in the direction of the arrows.

Fig. 8 is a section similar to Fig. 7 but taken substantially along the line 8—8 of Fig. 3, looking in the direction of the arrows.

Fig. 9 is a sectional view through the clutch assembly illustrating the position of the parts in released condition; and Fig. 10 is an exploded view in perspective showing the parts constituting the clutch assembly of the present invention.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

Referring now particularly to the drawings, there is shown therein one form of improved clutch assembly and operating handle embodying the present invention which, merely by way of illustration, is applied to a window regulator installed in a vehicle body for the purpose of operating one of the windows thereof. In Figs. 1 and 2, 11 designates a conventional type of embossed mounting plate for the window regulator mechanism which is secured in any suitable manner to the inner door or other body panel. A regulator arm 12 is pivotally mounted at 13 to the inner face of the plate and is secured at its inner end as by means of a rivet 14, to a toothed segment or sector 15. The driven member of the clutch mechanism about to be described includes a gear or pinion which, when the assembly is installed, meshes with the teeth of the sector 15 to drive the same and its fixed regulator arm 12 to raise and/or lower the window panel (not shown) to which the outer end of the arm 12 is connected as is well known. Thus far, the parts described are generally of conventional nature. The interior trim or panel is shown at 16 and, as seen in Fig. 2, is interposed between the clutch mechanism proper and the driving or operating handle for the clutch mechanism to thus conceal from view said clutch mechanism as well as the regulator mechanism to which it is connected.

The clutch operating handle, shown as a whole at 20, comprises at its outer end a rotatable knob or grip 21. At its inner end the handle is enlarged and is in the form of a relatively thin disk-like member 22 which is provided with a flat surface 23 on its outer face which is adapted to lie substantially flush with the inner or adjacent face of the trim material 16. As best seen in Fig. 10, the enlarged portion of the operating handle is provided with a centrally disposed integral boss 24 having external shallow splines or flutings and intervening grooves shown at 25. The flat surface or face 23 is also provided with a radially extending slot or keyway 26 for a purpose to be hereinafter described. The boss is adapted to be passed through an opening 28 formed in a clutch housing or casing member 27 and receives therein a driving ring 29 provided with internal flutings or splines 30 and intervening grooves which mate with the splines and grooves 25 of the boss. The ring 29 is provided with diametrically opposed locking lugs or outward projections 31. The casing 27 is adapted to receive a cage or annular member 32 provided with an interrupted circumferential flange comprising a series of annular disposed projecting portions or arcuate sections 33. The cage is provided with a centrally disposed flanged hub 34 which has diametrically opposed tongues 35 pressed inwardly therefrom to provide recesses 34a. The hub portion 34 surrounds the peripheral face of the ring member 29 and the locking recesses 34a formed by pressing out the tongues 35 are adapted to receive snugly the projections 31 on the ring when the parts are assembled. The cage 32 has a relatively loose fit within the casing so that it can be rotated relative to the casing. A substantially rectangular coupling member or block, shown as a whole at 36 is provided with a central opening 37 which permits the member to fit over the fluted or splined outer end of the hub member 24. This block or intermediate coupling member 36 is provided in its opposite outer and inner faces, respectively, with angularly disposed slots or grooves 38 and 39 arranged 90 degrees with respect to each other. The grooves 39 are adapted to receive and fit over the lugs or tongues 35 of the cage member and the outer slots or grooves 38 are adapted to receive the projecting lugs or tongues 40 of a pinion assembly, shown as a whole at 139, with a relatively snug fit. Thus it will be seen that the parts 24, 29 and 32 when assembled together as a unit, constitute the driving element or portion of the clutch assembly and that the block 36 and pinion or gear unit 139 constitute the driven portion or element of the clutch assembly. The gear or pinion assembly 139, as shown, comprises a disk-like base 41 from which the previously mentioned lugs or tongues 40 project in diametrically opposite directions and a gear or pinion portion 42 which is secured to the base or disk 139 in any suitable manner, such as by upsetting the base of the gear and its hub portion 43 to lock it to the base 139.

It will be understood that the parts 24, 29 and 32, when assembled, are adapted to be rotated as a unit by the handle 20, and provide the driving unit or portion of the clutch mechanism. The slots 39 on the inner face of the block member 36 are of greater width than the width of the lugs or tongues 35 of the cage member so that when the block is slipped over the boss 24 with the slots 39 receiving the lugs or tongues 35, there is sufficient clearance to allow for some relative play, or rotative movement of the block with respect to the boss 24. The slots 38, on the other hand, are of such a width as to receive the projections or lugs 40 of the gear member with a relatively snug fit so as to prevent any material or appreciable relative rotative or oscillatable movement between the block and the gear.

The block 36 is provided with flat right angularly disposed outer surfaces 36a. When the parts are assembled, rollers or the like 44 are placed in the spaces between the flat outer sides or walls 36a of the block member and the wall 27c of the housing and are free to rotate in the notches or spaces 33a between the spaced flange members 33. With the parts assembled as described it will be noted that the inner annular wall 27c of the housing 27 and the flat faces or sides 36a of the member 36, together with the notches or spaces 33a, provide a race for the roller bearings 44. Thus, when the parts are assembled, it is possible to rotate the gear or pinion 42 in either direction by means of the driving or operating handle 20. When, however, an unauthorized attempt is made to move the window glass of the vehicle without operating the handle 20, the attempted rotation of the handle driven elements 36 and 139 of the clutch assembly will cause the roller bearings 44 to jam or bind against the annular wall of the casing or housing 27 and prevent any movement of the parts, thus functioning as a lock to maintain the window glass against movement except through the medium of the handle 20.

The housing 27 has an outwardly directed circumferential flange 27a provided with holes or openings 27b for the purpose of permitting the clutch assembly to be secured to the regulator backing plate 11 in any suitable manner, as by means of rivets 45. As best seen in Figs. 2, 7, 8 and 9, the regulator plate 11 is provided with an outwardly and upwardly bent offset portion or tongue 11a having a hole or opening formed therein to receive the hub 43 of the gear unit 139 to maintain the gear 42 in operative position with relation to the toothed sector 15.

The housing 27, ring 29, cage 32, intermediate block or coupling member 36 and the gear unit 139 are first assembled and applied or attached to the regulator plate 11. It will be noted, see particularly Figs. 2, 7, 8 and 9, that these parts of the whole clutch assembly, when installed in the vehicle body are disposed behind or at the outer side of the finish trim or upholstery panel 16 and are thus concealed with the exception of the opening or hole formed in the panel. After the installation just described, the handle member 20 and its fixed hub 24 are applied to the assembly by inserting the hub through the opening in the trim panel and the opening in the casing or housing member 27. In this connection, it is to be noted that the hub is radially slotted to support a spring pressed locking member or bifurcated bolt 24a, the lower ends 24b of which project downwardly through the slot (see Fig. 2) so that upon inserting the hub in the hole or opening 28 of the housing 27 and pressing the handle member inwardly, the locking device snaps into place against the inner face of the housing or casing member 27. In order to allow the operating handle 20 to be released without the necessity of removing or loosening the finish trim or panel 16, the latch bolt or member 24a is provided with a forwardly or outwardly extending finger or projection 24c which is adapted to project into the groove or slot 26 formed in the outer or rear face 23 of the handle. This will allow the insertion of a screwdriver or other tool, such as the tool 46, into the slot 26 into engagement with the finger 24c to move the locking plate 24a upwardly against the action of the coil spring 24d to release the lower ends 24b (see Figs. 2 and 9) from the casing, whereupon the handle 20 and its attached hub member 24 and locking device 24a can be removed.

I claim:

1. In a clutch assembly for a window regulator having a crank handle provided with an integral exteriorly splined hub, a casing having an inner annular wall, a driving ring interiorly splined for telescopic connection to said hub, an annular cage rotative within said casing wall and having a marginal flange formed with spaced slots, a driving connection between said ring and cage, a driven block having a lost motion coupling connection with said cage and provided with outer angularly related flat sides, roller elements anchored in said slots and interposed between said flat sides and said casing wall, and a pinion coupled to said driven block.

2. In a clutch assembly for a window regulator having a crank handle provided with an integral exteriorly splined hub, a casing having an inner annular wall, a driving ring interiorly splined for telescopic connection to said hub, an annular cage rotative within said casing wall and having a marginal flange formed with spaced slots, a driving connection between said ring and cage, a driven block having a lost motion coupling connection with said cage and provided with outer angularly related flat sides, roller elements anchored in said slots and interposed between said flat sides and said casing wall, and a pinion coupled to said driven block, said coupling connection comprising lugs on said cage extending into notches formed at one face of the driven block.

3. In a clutch assembly for a window regulator having a crank handle provided with an integral exteriorly splined hub, a casing having an inner annular wall, a driving ring interiorly splined for telescopic connection to said hub, an annular cage rotative within said casing wall and having a marginal flange formed with spaced slots, a driving connection between said ring and cage, a driven block having a lost motion coupling connection with said cage and provided with outer angularly related flat sides, roller elements anchored in said slots and interposed between said flat sides and said casing wall, and a pinion coupled to said driven block, said driving connection comprising outwardly projecting lugs on said ring extending into recesses formed in the hub of said cage.

4. In a clutch assembly for a window regulator having a crank handle provided at its inner end with a hub, a driving ring fitting over said hub and detachably connected thereto, a hollow casing having an inner annular wall within which said hub projects, an annular cage rotative within said wall and having a driving connection with said ring, a driven member within the cage, rolling clutch elements interposed between the driven member and said casing wall and anchored in apertures in the cage, said driven member having a lost motion coupling connection with the cage, and a member drivingly connected to said driven member and provided with a pinion gear.

5. In a clutch assembly for a window regulator having a crank handle provided at its inner end with a hub, a driving ring fitting over said hub and detachably connected thereto, a hollow casing having an inner annular wall within which said hub projects, an annular cage rotative within said wall and having a driving connection with said ring, a driven member within the cage, rolling clutch elements interposed between the driven member and said casing wall and anchored in apertures in the cage, said driven member having a lost motion coupling connection with the cage, and a member drivingly connected to said driven member and provided with a pinion gear, said driving connection comprising mating lugs and recesses providing a positive connection free of any substantial lost motion.

6. In a clutch assembly for a window regulator having a crank handle provided at its inner end with a hub, a driving ring fitting over said hub and detachably connected thereto, a hollow casing having an inner annular wall within which said hub projects, an annular cage rotative within said wall and having a driving connection with said ring, a driven member within the cage, rolling clutch elements interposed between the driven member and said casing wall and anchored in apertures in the cage, said driven member having a lost motion coupling connection with the cage, and a member drivingly connected to said driven member and provided with a pinion gear, said coupling connection comprising mating lugs and recesses permitting rotative movement of the driven member relative to the cage.

7. In a clutch assembly for a window regulator having a crank handle provided at its inner end with a hub, a driving ring fitting over said hub and detachably connected thereto, a hollow casing having an inner annular wall within which said hub projects, an annular cage rotative within said wall and having a driving connection with said ring, a driven member within the cage, rolling clutch elements interposed between the driven member and said casing wall and anchored in apertures in the cage, said driven member having a lost motion coupling connection with the cage, and a member drivingly connected to said driven member and provided with a pinion gear, said cage having a common means forming in part said driving connection and in part said coupling connection.

8. In a clutch assembly for a window regulator having a crank handle provided at its inner end with a hub, a driving ring fitting over said hub and detachably connected thereto, a hollow casing having an inner annular wall within which said hub projects, an annular cage rotative within said wall and having a driving connection with said ring, a driven member within the cage, rolling clutch elements interposed between the driven member and said casing wall and anchored in apertures in the cage, said driven member having a lost motion coupling connection with the cage, a disk drivingly connected to said driven member, and a pinion secured to said disk.

9. In a clutch assembly for a window regulator having a crank handle provided at its inner end with a hub, a driving ring fitting over said hub and detachably connected thereto, a hollow casing having an inner annular wall within which said hub projects, an annular cage rotative within said wall and having a driving connection with said ring, a driven member within the cage, rolling clutch elements interposed between the driven member and said casing wall and anchored in apertures in the cage, said driven member having a lost motion coupling connection with the cage, and a member drivingly connected to said driven member and provided with a pinion gear, said driven member comprising a block having flat angularly related outer sides engageable with said clutch elements.

10. In a clutch assembly for a window regulator having a crank handle provided at its inner end with a hub, a driving ring fitting over said hub and connected thereto, a hollow casing having an inner annular wall within which said hub projects, an annular cage rotative within said wall, a driven member within said cage, rolling clutch elements between the driven member and said wall and held in place by the cage, a driven gear connected to the driven member, and a common means on the cage for connecting it to said ring and said driven member.

11. In a clutch assembly for a window regulator having a crank handle provided at its inner end with a hub, a driving ring fitting over said hub and connected thereto, a hollow casing having an inner annular wall within which said hub projects, an annular cage rotative within said wall, a driven member within said cage, rolling clutch elements between the driven member and said wall and held in place by the cage, a driven gear connected to the driven member, and a common means on the cage for connecting it to said ring and said driven member, said means comprising lugs on the cage fitting into recesses in the driven member, said cage having recesses to receive lugs on said ring.

12. In a clutch assembly for a window regulator having a crank handle provided at its inner end with a hub, a flat sided driving ring fitting over said hub and splined thereto, a hollow casing having an inner annular wall within which said hub projects, an annular cage rotative within said wall, a driven member within said cage, rolling clutch elements between the driven member and said wall and held in place by the cage, a driven gear connected to the driven member, and a common means on the cage for connecting it to said ring and said driven member.

13. In a clutch assembly for a window regulator having a crank handle provided at its inner end with a hub, a driving ring fitting over said hub and connected thereto, a hollow casing having an inner annular wall within which said hub projects, an annular cage rotative within said wall, a driven member within said cage, rolling clutch elements between the driven member and said wall and held in place by the cage, a disk coupled to said driven member by mating lugs and recesses, a pinion fixed to the disk, and a common means on the cage for connecting it to said ring and said driven member.

14. In a clutch assembly for a window regulator, a hollow casing, a driving member within the casing, a cage rotative within the casing and having a central aperture marginally flanged, said driving member fitting into said flanged aperture and drivingly connected thereto, said cage having an outer annular flange, a driven member housed entirely within said annular flange, rolling clutch elements interposed between exterior surfaces of said driven member and the inner wall of the casing and anchored in apertures in said annular flange of the cage, a driving connection between the cage and said driven member, and a pinion driven from said driven member.

15. In a clutch assembly for a window regulator, a hollow casing, a driving member within the casing, a cage rotative within the casing and having a central aperture marginally flanged, said driving member fitting into said flanged aperture and drivingly connected thereto, said cage having an outer annular flange, a driven member housed entirely within said annular flange, rolling clutch elements interposed between exterior flat surfaces of said driven member and the inner wall of the casing and anchored in apertures in said annular flange of the cage, a driving connection between the cage and said driven member, and a pinion driven from said driven member, the driving connections between said cage and the driven and driving members comprising lugs and recesses on the cage.

16. In a clutch assembly for a window regulator having an operating handle provided with a hub, a driving member detachably connected to said hub, a hollow casing having an inner annular wall within which said hub projects, an annular cage rotative within said wall and having a driving connection with said driving member, a driven member within the cage, movable clutch elements interposed between the driven member and said casing wall and located in apertures in the cage, said driven member having a lost motion connection with the cage, and a member drivingly connected to said driven member and provided with a pinion gear.

17. In a clutch assembly for a window regulator having manually operable means including a hub, a driving member fitting over said hub and connected thereto, a casing having an inner wall within which said hub projects, a cage rotative within said wall, a driven member within said cage, clutch elements located between the driven member and said wall and held in place by the cage, a driven gear connected to the driven member, and means on the cage for connecting said cage to said driving member and said driven member.

WILLIAM MARSHALL.